United States Patent [19]
Salgado et al.

[11] Patent Number: 5,970,224
[45] Date of Patent: Oct. 19, 1999

[54] MULTIFUNCTIONAL PRINTING SYSTEM WITH QUEUE MANAGEMENT

[75] Inventors: David L. Salgado, Victor; Donald J. Gusmano, Henrietta; Jeffrey D. Debes; Gary W. Kassmann, both of Rochester; Kenneth J. Buck, Webster, all of N.Y.

[73] Assignee: Xerox Corporation, Stamford, Conn.

[21] Appl. No.: 09/014,486

[22] Filed: Jan. 28, 1998

Related U.S. Application Data

[60] Provisional application No. 60/043,809, Apr. 14, 1997.

[51] Int. Cl.$^6$ ........................................... G06F 15/00
[52] U.S. Cl. ............................................. 395/115; 395/113
[58] Field of Search ..................................... 395/101, 112, 395/113, 114, 115, 116, 821, 826, 834, 829, 836, 860, 877, 866, 872, 874, 876; 358/404, 444, 437

[56] References Cited

U.S. PATENT DOCUMENTS

| | | | |
|---|---|---|---|
| 4,947,345 | 8/1990 | Paradise et al. | 364/519 |
| 5,206,735 | 4/1993 | Gauronski et al. | 358/437 |
| 5,495,339 | 2/1996 | Stegbauer | 358/404 |
| 5,511,150 | 4/1996 | Beaudet et al. | 395/113 |
| 5,535,009 | 7/1996 | Hansen | 358/296 |

FOREIGN PATENT DOCUMENTS 58-162821   8/1983   Japan .

Primary Examiner—Arthur G. Evans

[57] ABSTRACT

A method is provided for a multifunctional printing system in which a first job, developed at a first service, and a second job, developed at a second service are placed in a queue for processing. A first value is assigned to the first job and a second value is assigned to the second job, with the first and second values varying in magnitude as a function of the first and second services. In practice, the first job is placed in the queue and a portion thereof is processed. Subsequently, the second job is placed in the queue and processing of the first job is interrupted by the second job if the second value is greater in magnitude than the first value.

12 Claims, 8 Drawing Sheets

| Time (in munutes) and event | Mark Queue | | | | |
|---|---|---|---|---|---|
| Time 0: A normal scan job (Job A) enters the mark queue and begins marking. | Job A<br>Priority: 30 | | | | |
| Time 3: A normal fax job (Job B) enters the mark queue. | Job A<br>Priority: 30 | Job B<br>Priority: 10 | | | |
| Time 4: An interrupt net job (Job C) enters the mark queue and begins marking. | Job A<br>Priority: 30 | Job C<br>Priority: 20 | Job B<br>Priority: 10 | | |
| Time 5: System increments Job A's priorty by 10. | Job A<br>Priority: 40 | Job C<br>Priority: 20 | Job B<br>Priority: 10 | | |
| Time 7: A normal scan job (Job D) enters the mark queue. | Job A<br>Priority: 40 | Job D<br>Priority: 30 | Job C<br>Priority: 20 | Job B<br>Priority: 10 | |

FIG. 8

| New Job's Service \ Current Job's Service | Copy | Print | Fax Receive | Fax Send | Local File | Remote File |
|---|---|---|---|---|---|---|
| Copy | Yes | Yes | Yes | Yes | Yes | Yes |
| Print | | Yes | | | | Yes |
| Fax Receive | | Yes | Yes | | Yes | Yes |
| Fax Send | | Yes | | Yes | Yes | Yes |
| Local File | | | | | Yes | Yes |
| Remote File | | | | | | Yes |

| Time (in minutes) and event | Mark Queue | | | | |
|---|---|---|---|---|---|
| Time 0: A normal scan job (Job A) enters the mark queue and begins marking. | Job A Priority: 30 | | | | |
| Time 3: A normal fax job (Job B) enters the mark queue. | Job A Priority: 30 | Job B Priority: 10 | | | |
| Time 4: An interrupt net job (Job C) enters the mark queue and begins marking. | Job A Priority: 30 | Job C Priority: 20 | Job B Priority: 10 | | |
| Time 5: System increments Job A's priority by 10. | Job A Priority: 40 | Job C Priority: 20 | Job B Priority: 10 | | |
| Time 7: A normal scan job (Job D) enters the mark queue. | Job A Priority: 40 | Job D Priority: 30 | Job C Priority: 20 | Job B Priority: 10 | |

FIG. 9

| Time (in minutes) and event | Mark Queue | | | | |
|---|---|---|---|---|---|
| Time 8: System increments Job B's priority to 10. An interrupt scan job (Job E) enters the mark queue and interrupts Job A. | Job E Priority: 50 | Job A Priority: 40 | Job D Priority: 30 | Job C Priority: 20 | Job B Priority: 20 |
| Time 9: System increments Job C's priority by 10. Job E completes marking. Job A resumes marking. | Job A Priority: 40 | Job D Priority: 30 | Job C Priority: 30 | Job B Priority: 20 | |
| Time 10: System increments Job A's priority by 10. A normal scan job (Job F) enters the mark queue. | Job A Priority: 50 | Job D Priority: 30 | Job C Priority: 30 | Job F Priority: 30 | Job B Priority: 20 |
| Time 12: System increments Job D's priority by 10. Job A completes marking. Job D begins marking. | Job D Priority: 40 | Job C Priority: 30 | Job F Priority: 30 | Job B Priority: 20 | |
| Time 13: System increments Job B's priority by 10. An interrupt net job (Job G) enters the mark queue. | Job D Priority: 40 | Job C Priority: 30 | Job F Priority: 30 | Job B Priority: 30 | Job G Priority: 20 |

FIG. 10

MULTIFUNCTIONAL PRINTING SYSTEM WITH QUEUE MANAGEMENT

Priority is claimed to Provisional Application No. 60/043,809 filed Apr. 14, 1997.

BACKGROUND

The present application is related in subject matter to and cross-referenced with both U.S. patent application Ser. No. 08/(Attorney's Docket No. 94871) (entitled Multifunctional Printing System with Queue Management and filed by Gusmano et al.) and U.S. patent application Ser. No. 08/ (Attorney's Docket No. 94899) (entitled Multifunctional Printing System and filed by Salgado et al.) both of which applications were filed on the same day as the present Application. The disclosures of the above-mentioned applications are incorporated herein by reference.

This invention relates generally to a multifunctional printing system with one or more queues and, more particularly, to a contention management scheme which contemplates both the prioritization of one or more jobs, on the basis of the source at which the one or more jobs were developed, for the sake of managing insertion of the prioritized one or more jobs into the one or more queues, and that jobs will be processed in accordance with a preprogrammed set of rules.

Electronic printing systems typically include an input section, sometimes referred to as an input image terminal ("IIT"), a controller, and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340 Patentees: Prokop et al. Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955 Patentees: Shope et al. Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071 Patentee: Jones Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107 Patentees: Naito et al. Issued: Apr. 11, 1989

U.S. Pat. No. 5,021,892 Patentees: Kita et al. Issued: Jun. 4, 1991

U.S. Pat. No. 5,175,633 Patentees: Saito et al. Issued: Dec. 29, 1992

U.S. Pat. No. 5,223,948 Patentees: Sakurai et al. Issued: Jun. 29, 1993

U.S. Pat. No. 5,276,799 Patentee: Rivshin Issued: Jan. 4, 1994

U.S. Pat. No. 5,307,458 Patentees: Freiburg et al. Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:

U.S. Pat. No. 5,436,730 Patentee: Hube Issued: Jul. 25, 1995

The concept of a print queue is integral to the operation of various digital reproduction systems. Through appropriate queue management, a job currently in the process of being printed can be interrupted with an interrupt job in a manner disclosed by the following:

U.S. Pat. No. 5,206,735 Patentees: Gauronski et al. Issued: Apr. 27, 1993

Referring particularly to the '735 patent, a special job is obtained from a mass memory, shown by way of a "job file", and inserted into the queue at a "logical point" with respect to the job currently being processed. When printing reaches the logical point at which the special job was inserted, the job currently being processed is interrupted so that the special job is processed. Upon completion of the processing of the special job, processing of the interrupted job is resumed.

The queue disclosed in the '735 patent is managed, in the normal case, on a first-come-first-serve ("FIFO") basis except when special or interrupt jobs are inserted into the queue. In the illustrated embodiment of the '735 patent, the interrupt job is inserted into the queue as described above except when an interrupt job is currently in the process of printing. When an interrupt job is currently printing, a second interrupt job is placed behind the interrupt job in process. Essentially, priority is given to the interrupt job currently in process. The concerns associated with interrupting a first interrupt job with a second interrupt job are also addressed in the following patent:

U.S. Pat. No. 5,535,009 Patentee: Hansen Issued: Jul. 9, 1996

The queue management arrangement of the '735 patent is not optimally suited for use in a multifunctional context because it does not differentiate among job types for the purpose of managing the queue. Consequently, a print job cannot, in many common instances, be given priority over a copy job, or vice versa. Systems particularly well suited for use with a multifunctional printing systems are disclosed by the following references:

U.S. Pat. No. 4,947,345 Patentees: Paradise et al. Issued: Aug. 7, 1990

Japanese Application 58-152821 Published: Aug. 22, 1983

Referring particularly to the '345 patent, a first queue is used to store copy and print jobs, while a second queue, communicating with the first queue, is used to store facsimile ("fax") jobs in parallel with the first queue. After a preselected number of one or more fax jobs is stored in the second queue, the stored job(s) is placed in front of the jobs of the first queue so that the one or more fax jobs can be printed ahead of the currently queued copy/print jobs.

While the queue management scheme of the '345 patent accommodates for job differentiation, it only does so in a limited manner. For instance, the fax queue can be given preferential treatment relative to the copy/print queue, so that one or more fax jobs can be printed ahead of a copy or print jobs. No mechanism for treating a given copy or print job preferentially, however, is suggested. Even though U.S. Pat. No. 5,511,150 to Beaudet et al. (Issued Apr. 23, 1996) accommodates for preferential treatment of copy jobs relative to print jobs, it does not do so in a queue context as discussed in the references above. Additionally, in the approach of the '345 patent, a copy or print job can get "stuck" in the copy/print job queue when multiple fax jobs are given preferential processing treatment relative to the copy/print jobs.

Essentially, the '345 patent, while well intended for its limited purpose, lacks the sort of flexible queue management that is required by multifunctional printing systems whose capabilities and uses are increasing at an ever-increasing rate. It would be desirable to provide a multifunctional printing system that provides a wide range of queue management so that the corresponding system can accommodate for both the specific needs of many different users and the many different types of uses demanded by those users. At the same time, it would desirable to provide a queue management system for a multifunctional printing system facilitating the appropriate thruput of all types of jobs which might be encountered by the multifunctional printing system.

The disclosure of each reference mentioned or discussed in the above Background is incorporated herein by reference.

SUMMARY OF THE INVENTION

In accordance with one aspect of the presently disclosed invention there is provided a method of managing the processing of a plurality of jobs in a queue of a multifunctional printing system in which a first job and a second job are stored in the queue for processing. The multifunctional printing system includes a controller for facilitating placement of the jobs into the queue with the first job being developed at a first service and the second job being developed at a second service. The method comprises: a) determining, with the controller, that the first job was developed at the first service and that the second job was developed at the second service; b) in response to said determining of (a), assigning a first value to the first job and a second value to the second job, the first and second values varying respectively in magnitude as a function of the first and second services; c) placing the first job with its assigned first value in the queue at a first selected location; d) processing at least a portion of the first job; and e) interrupting processing of the first job to process the second job when the magnitude of the second value is greater than the magnitude of the first value.

In accordance with another aspect of the presently disclosed invention there is provided a method of managing the processing of a plurality of jobs in a queue of a multifunctional printing system in which a first job, second job and third job are stored in the queue for processing. The multifunctional printing system includes a controller for facilitating placement of the jobs into the queue with the first job being developed at a first service, the second job being developed at a second service and the third job being developed at a third service. The method comprises: a) determining, with the controller, that the first job was developed at the first service, the second job was developed at the second service and the third job was developed at the third service; b) in response to said determining of (a), assigning a first value to the first job, a second value to the second job and a third value to the third job, the first, second and third values varying respectively in magnitude as a function of the first, second and third services; c) placing the first job and the second job at a first selected location in the queue and a second location in the queue, respectively; d) processing at least a portion of the first job; and e) interrupting processing of the first job to process the third job when the magnitude of the third value is greater than the magnitude of either of the first value or the second value, and (ii) a preselected condition is met.

In accordance with yet another aspect of the presently disclosed invention there is provided a method of managing the processing of a plurality of jobs in a queue of a multifunctional printing system in which a first job and a second job are stored in the queue for processing. The multifunctional printing system includes a job memory for storing a first set of image data corresponding with the first job and a second set of image data corresponding with the second job. The multifunctional printing system further includes a controller for facilitating placement of the jobs into the queue with the first job being developed at a first service and the second job being developed at a second service. The method comprises: a) placing the first job in the queue and processing a portion of the first job, the first portion being less than all of the first job; b) prior to storing the second set of image data in the job memory, determining whether said storing would reduce an amount of available memory in the job memory below a selected threshold; and c) when it is determined, with said (b), that the amount of available memory would be reduced below the selected threshold, processing the second job ahead of the first job so that a second portion of the first job remains unprocessed and all of the second job is processed prior to the processing of the first job second portion.

BRIEF DESCRIPTION OF THE DRAWINGS

FIG. 8 is a schematic view of a job placement table stored in memory and used to place jobs in, among other places, the queue of FIG. 7; and FIGS. 9 and 10 comprise a schematic view depicting a manner in which jobs progress in a queue (see e.g., FIG. 7) as a function of one aspect of a contention management scheme embodied in the present invention.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
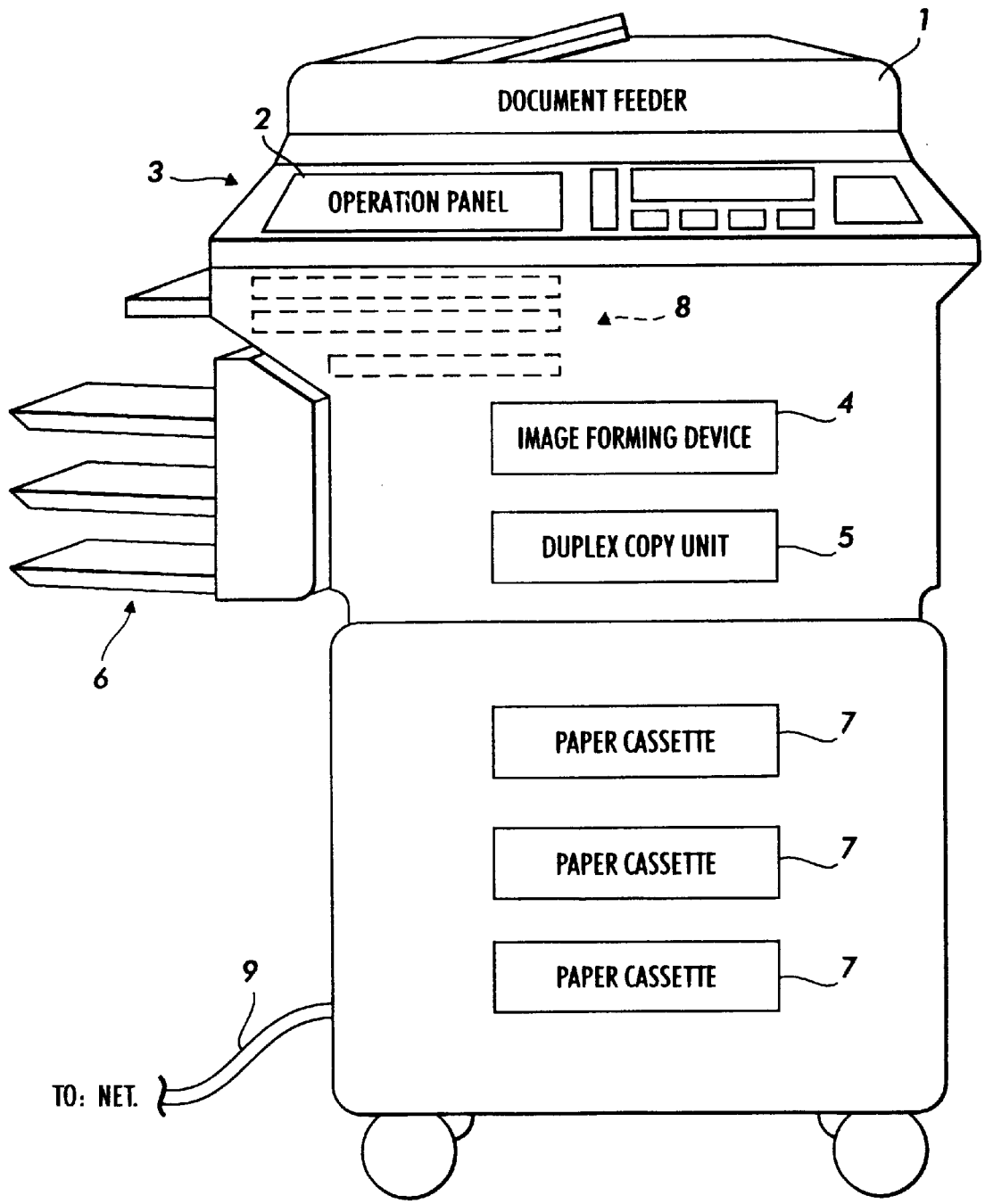
FIG. 1 is a perspective view of a networked digital copier suitable for receiving a job developed in accordance with the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
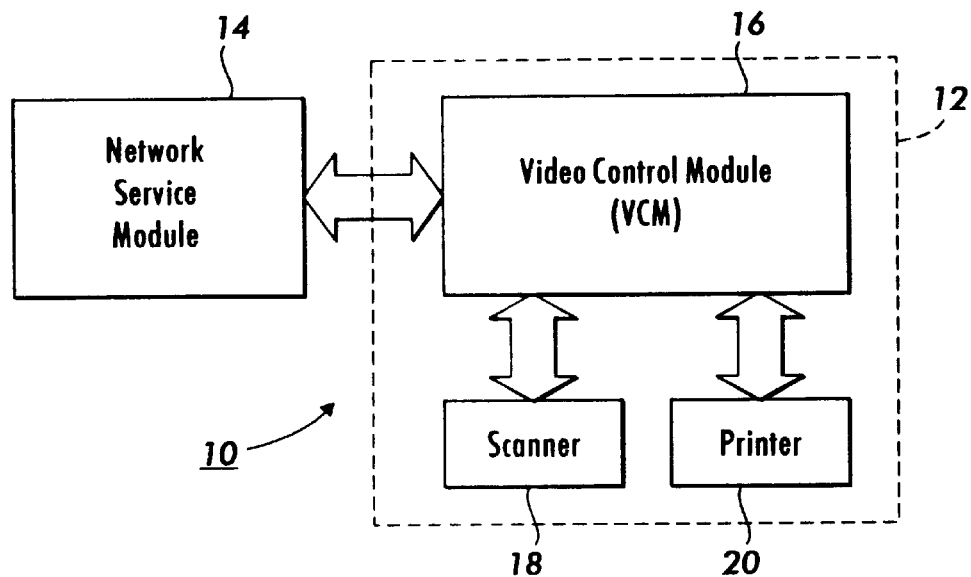
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
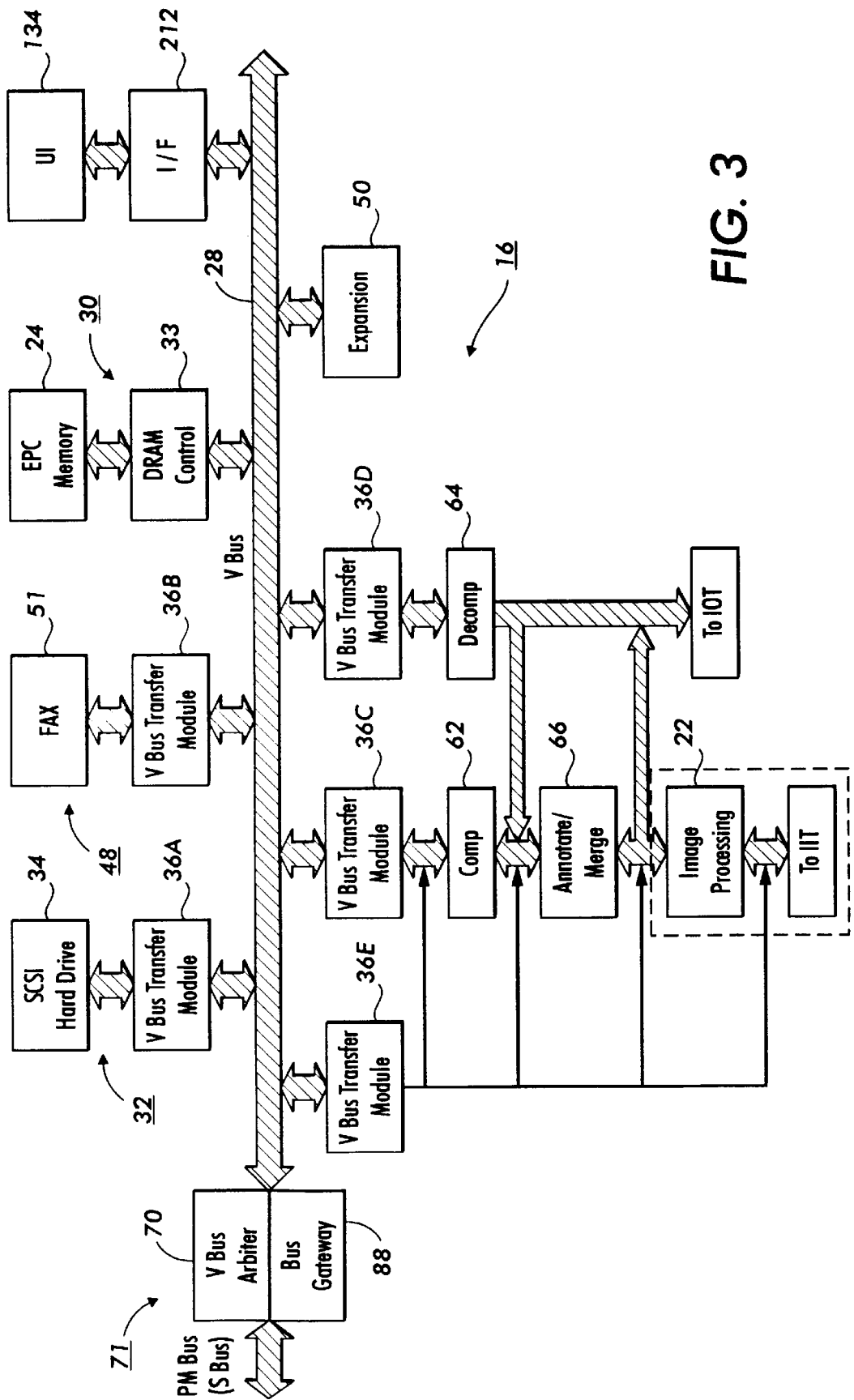
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of the transfer module 36a through use of a suitable interface and a SCSI line.

Figure 4:
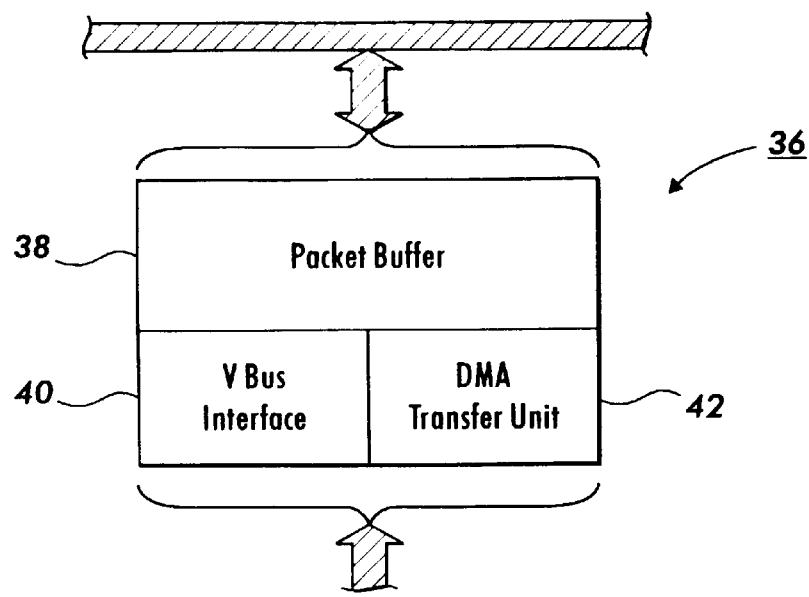
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
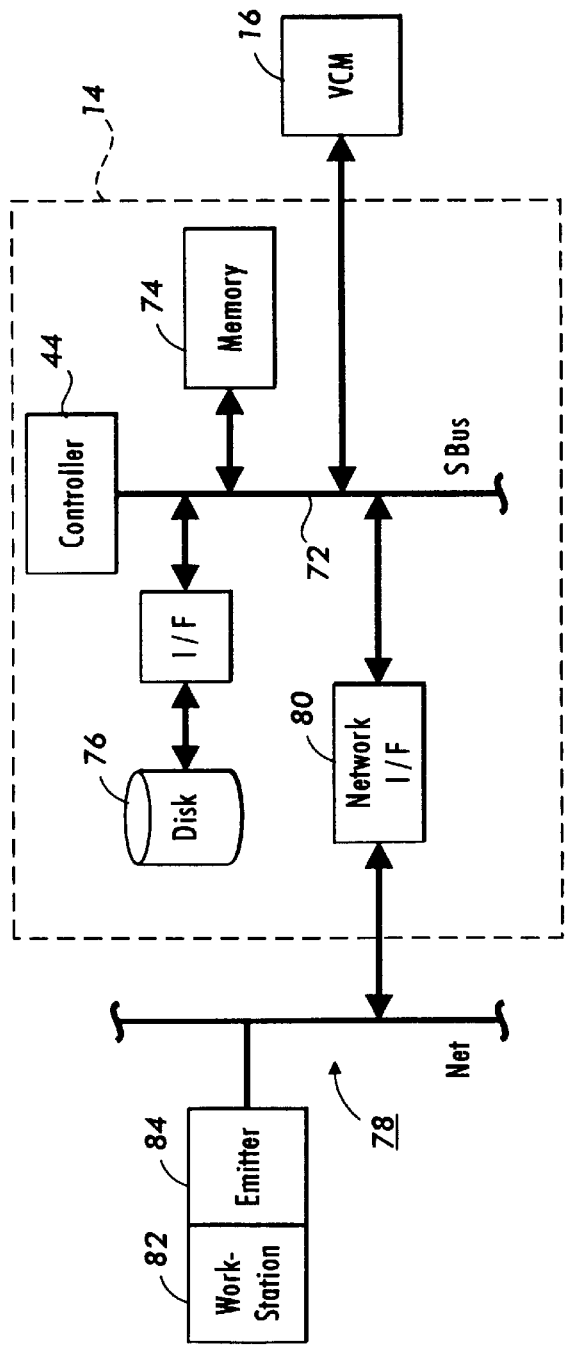
FIG. 6 is a block diagram of a network controller for the printing machine of FIG. 2.

Adjustment of the packet size is achieved with the VBus interface 40 (FIG. 4) and a system controller 44 (FIG. 6).

Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, image transfer is facilitated with a DMA transfer unit which employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
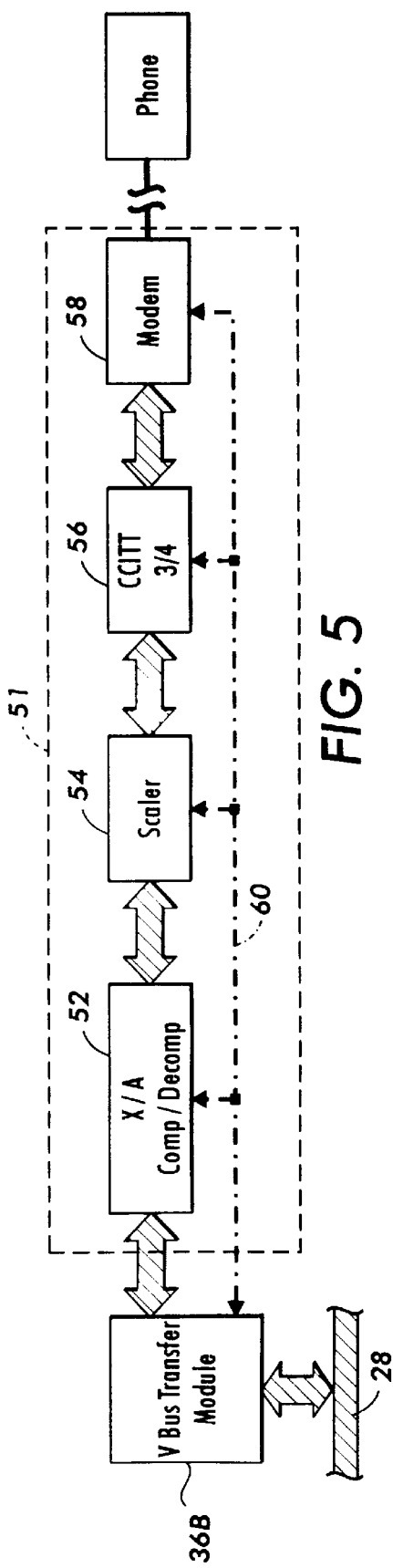
FIG. 5 is a block diagram of a facsimile card used in conjunction with the video control module of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
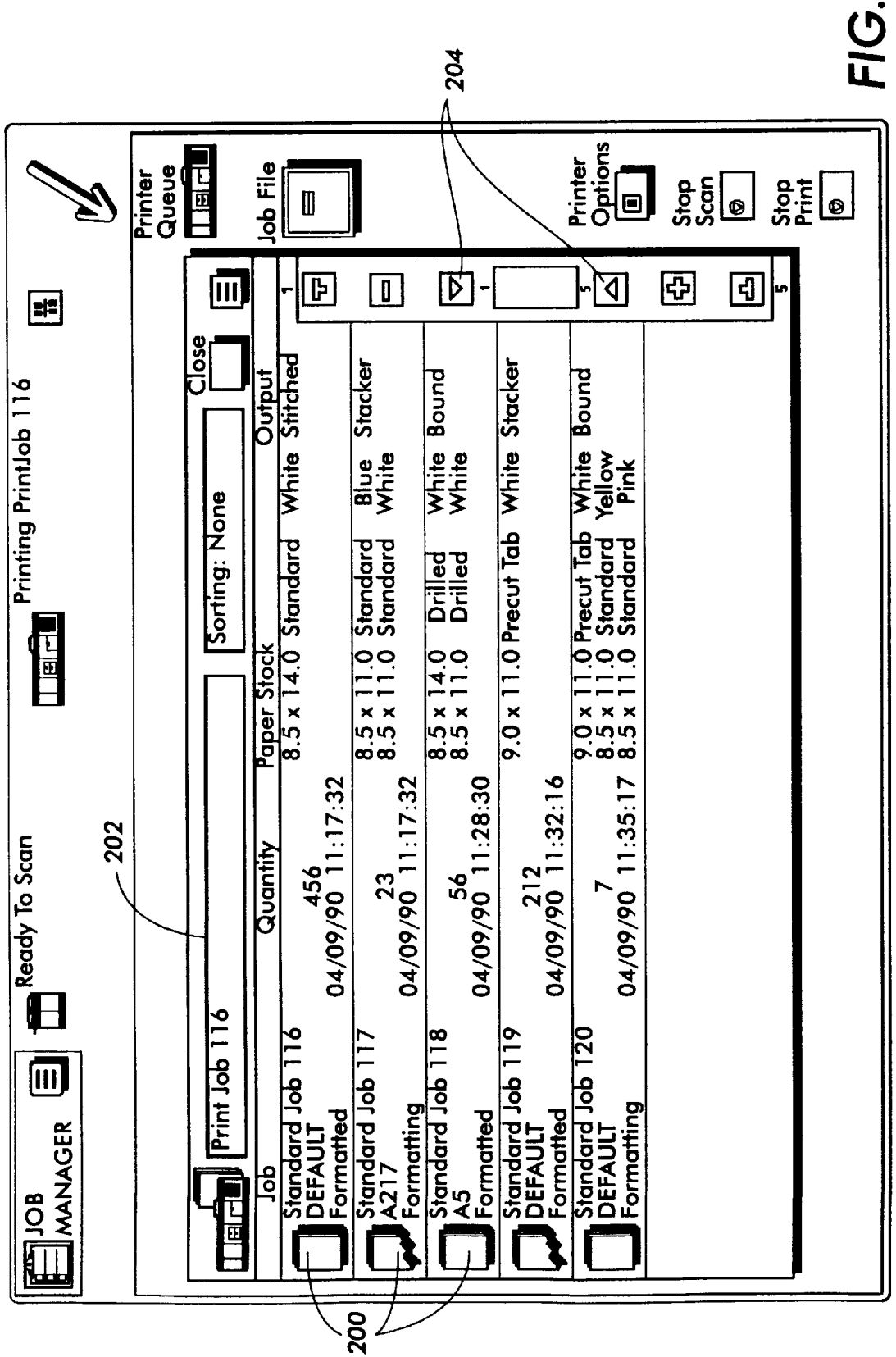
FIG. 7 is an elevational view of a queue used to store jobs pursuant to processing thereof.

Referring to FIG. 7, a queue of jobs 200 ready for processing with the printer 20 (FIG. 1) is shown. As with other conventional print queues, the job currently being printed is displayed in a window 202 and buttons 204 can be employed to scroll the list of jobs up or down. It should be appreciated that in a multifunctional machine, of the type discussed in the Background above, more than one queue would preferably be employed to accommodate for the various services offered. For example, jobs waiting to be scanned would reside in a scan queue while jobs waiting to be faxed would reside in a fax queue. Essentially the print or mark queue of FIG. 7 may be just one of the plurality of queues employed in the printing system 10. Additionally, it should be appreciated that jobs may be inserted into the queues in a manner consistent with that disclosed by U.S. Pat. No. 5,206,735. Finally, it will be appreciated that the queue could be maintained in, among other locations, the VCM FIG. 3 or the Network Service Module (FIG. 6).

In any multifunctional product (also referred to below as "MF Engine"), such as the printing system 10 described above, there is always the potential of multiple users requiring access to one or more subsystems at the same time. This access contention can occur in several areas of the MF Engine either as contention for a single resource e.g., EPC memory 24 (FIG. 3), or as a contention for multiple kinds of resources e.g., EPC memory and IIT. When a contention situation arises, the printing system must respond in a predictable, and controlled manner that satisfies the various users.

In the preferred embodiment, at least two contention management methods are contemplated:

1. First In First Out (FIFO) Job Management

In this method contention is handled on a first come first serve basis. Jobs submitted ahead of other jobs have first use of the required resource. Other jobs requesting that service are numerically ordered by their time of arrival and eventually have the opportunity to use the service.

2. In this method access to resources is managed with a "Key Operator/System Administrator ("KO/SA") defined algorithm. (See Table 1 below). With this algorithm, the KO/SA can arrange to have jobs defined according to job type, immediate walkup need, history of interruptions and other relevant factors. The algorithm can be configured to manage job contention in accordance with the desires of a typical printing system user. Since it is flexibly programmable, the algorithm can be made to accommodate for FIFO. In other words, FIFO is a subset of the capabilities of this algorithm.

It is contemplated that at least five job types will be handled by the KO/SA in printing system 10:

1. Copy Print or Walk-Up Jobs: Walk up user jobs requiring the use of the IIT and the corresponding marking resource;

2. Auto Report Print: Reports that are automatically printed, such as reports of machine or copier use, error logs, fax reports, etc. The reports, which are defined by the SA/KO, are printed from memory resources and require marking engine usage;

3. Net Print: Included in this job category are the following:
   a) Jobs arriving from network sources, via the network service module 14 (FIG. 1), which require marking resource,
   b) Network service module (also referred to as "ESS") soft mailbox jobs activated by a walk-up or remote user, and
   c) Any other jobs originating from the ESS or network;

4. Fax Mailbox: Included in this job category are the following:
   a) Fax receives (secure) which have been stored on the system for printout at a user's request,
   b) Local reports such as system usage or fax logs, and
   c) Any other jobs originating from the EPC memory 24 (FIG. 3) or the printing system (also referred to as "MFSYS");

5. Fax Print: Incoming Fax jobs that are meant to be printed immediately. Such jobs are captured in EPC memory 24 and then printed immediately.

The following terminology should be useful in obtaining a more complete understanding of the present description:

Authorized User: a user having a higher authority level than a casual user, but access rights less than that of a KO/SA. This is a reserved authority level intended for VIP Users.

Interrupt Level: A resource may be interrupted from the job it is currently working on. If this occurs, it is called a first level interrupt or interrupt level 1. If a job running in interrupt is interrupted itself, then this is a second level interrupt.

Job Type Priority: A priority assigned according to job or user type. An exemplary priority assignment, based on job type, is provided below.

Resource. Any mechanical, electronic or software component required to process a job.

Marking Resource: The resource used to print a job on a given media type.

Memory Resource: Types of Read/Write memory used by the printing system, e.g. memories 24, 34 (FIG. 3), 74 and 76 (FIG. 6).

Marked Job: A job which has been printed. This term is more generic than "printed job" and does not imply a particular method used for writing to the type of media.

Next to Print: This is the nomenclature for a job which is at the top of the queue of jobs and under stable/normal conditions, will be the "next to print" from the queue.

An important embodiment uses the following exemplary table, including contention priority algorithm presets, to optimize contention management:

This table, to which the description below relates, permits the KO/SA to define how the system should operate when a situation arises. The table serves to define what types of jobs exist in the system and how given contention situations should be managed. As will be appreciated by those skilled in the art, table headings for the above table, as well as comparable tables below, may vary as a function of system architecture so that, for example, certain walk-up jobs, such as ESS MB (mailbox) could also be viewed as net print jobs.

Referring specifically to Table 1, the columns of the table list all the types of user jobs (where contention can occur) that can occur in the machine. The rows of the table list the type of contention that can occur. The intersection of rows and columns define the machine behavior for that job type in that particular contention situation.

The following contention management feature descriptions are best understood by reference to the above Table 1:

Authorized User Override: This feature setting allows an authorized user (AU) to interrupt other jobs on the IOT. The AU has interrupt capability override for all types of jobs, even ones that have had their interrupt limitation exceeded, e.g., a print job which has interrupt limitation set at 4 has been interrupted 4 times by other jobs and is currently using the marking resource.

AU tagged jobs are priority 1 (highest). If the table setting is 'Y' the job will always interrupt other lower priority jobs. If the setting is 'N' it will honor the row 4 entry (Table 1) for the job type of the currently printing job.

Maximum ("Max" or "MAX") Number of Times a Job Type Can Be Interrupted: This defines how many times a job

TABLE 1

CONTENTION PRIORITY AGLORITHM PRESETS (IOT)

| # | | Param. | WalkUpJobs Copy Job or Floppy Job ESS MB Print Fax MB Print User initiated Reports ESS, MFSYS | Net Print | Fax Direct Print | Auto Report ESS& MFSYS | PSFax Out (PS decomposer only) |
|---|---|---|---|---|---|---|---|
| 1. | Authorized User (AU) Override All AU Jobs are priority 1. If 'Y' then AU job will interrupt IOT Job of that type. If 'N', AU job goes to top of queue as next to print. (Note: 'Y' means this will disregard the setting in row 4 for that column only, 'N' abides by row 4 setting) | Y/N | N | N | N | N | NA |
| 2 | Maximum Number of Times a Job can be Interrupted | 1–99 no limit | 5 | 5 | 5 | 5 | NA |
| 3 | Interrupt Button Interrupt IOT Job Enable/disable If set to 'Y', and interrupt button was selected, then Job becomes priority 2 and will interrupt an IOT Job of lesser priority. If 'N' and interrupt button was selected, then Job becomes priority 2 and will interrupt an IOT Job of lesser priority. If 'N' and interrupt button was selected, then Walk-Up Job becomes a priority 2 job. (Note: 'Y' means this will disregard the setting in row 4 for that column only, 'N' abides by row 4 setting) | Y/N | Y | Y | Y | Y | NA |
| 4 | Allow Job Type in Column to be Interrupted by Higher Priority Job Types? | Y/N | N | N | N | N | NA |
| 5 | Maximum Length of Time a Job can be in the Queue | 0.5– 24.0 hr | 1 | ← | ← | ← | ← |
| 6 | Job Type Priority (4 = highest, 7 = lowest) | 4–7 | 4 | 4 | 4 | 4 | 4 |

Key:
n/a = Not Applicable.
← = All of row set by leftmost column
Table as shown is in Default Template (1) configuration. NOTE: An interrupt button may be turned off, which would mean that any row 3 would settings be non functional.

can be interrupted. Once the set number of allowable times a job may be interrupted has been reached, the job can no longer be interrupted and will be allowed to finish its operation on the resource it is using. An exception to this rule would be the AU Override. The calculation of the number times a job has been interrupted is a summation of all the times other jobs have interrupted the job, e.g., a Copy Job has been interrupted at different times by a Fax job, and four different Print jobs, the MAX # of interrupts was set to 4, hence the MAX # of interrupts setting has been exceeded.

Interrupt Now (Y) or Do Job Next (N): When an Interrupt hard button on the printing machine 12 (FIG. 1) is enabled, any job which is tagged as an interrupt button job will receive a level 2 priority. If the Table 1, row 3 is set to 'Y' for a job type then that job type will override a 'N' in row 4 of the table and interrupt other jobs which are of lower priority.

Higher Priority Job Type Interrupt Enabled: If this is enabled with 'Y' then the Job Type may be interrupted by a Higher Priority Job type, or a Resource Exceeded condition (see table. 2).

Specify Job Type Priority: This defines the priority of the jobs based on job type. The basic types of jobs are listed in row 1 of Table 1. These generic job categories encompass a variety of specific job types so not all types of jobs need to be represented by the Table.

Operation: In one embodiment jobs are placed in a queue as they are submitted to the printing system. If one type of job has a higher priority than another type of job then it will be placed before that job in the queue. If two jobs have the same assigned priority then they are queued according to the time stamp they receive upon entering the queue (i.e., FIFO managed). Jobs queued and not able to mark because the marking engine has the wrong media or jobs in the queue held for similar reasons, will be bypassed by other jobs which are still able to use the marking engine. Once a job is at the top of the queue, if it has a higher priority than the currently printing job and if "Higher Priority Interrupt" is enabled, the higher priority job will interrupt the currently printing job.

Timer for Jobs in the Queue: This assures that a job will not become trapped in the queue of jobs by groups of higher priority jobs. A job type which has been in the queue for the maximum allocated time will be elevated to a job priority as described below. Nonetheless, the elevated job will obey all the rules defined by the table settings. In a situation where more than one job has reached its allocated time limit then they will be FIFO'd at the top of the queue.

Referring to the following Table 2, KO/SA settings may be provided for a "Resource Exceeded Condition":

Memory resource becomes full and the IOT is printing another job, this will enable the current print job to be interrupted so that the Fax job can be printed. This parameter amounts to instantly promoting the FAX job through the queue to the IOT and interrupting the marking engine to attempt to free up FAX memory resources.

To save customers time in configuring their systems, configuration templates will be available for selection by the KO/SA. If selected by a KO/SA, the templates will auto configure the Contention Table (See e.g., Table 1 above) to settings which best support a customer's needs. The system will, in one example, provide for six templates from which the user can select. These templates will provide definition for a variety of system configurations ranging from FIFO configuration systems to Fax or Print centric systems. The manufacturing default settings will be included as one of the six templates. This template will be labeled as the default settings or "FIFO" template. A template for queue management control of jobs which does not include job priority interrupt will also be provided.

The six exemplary templates are as follows:

1) Basic FIFO without Priority Based Interrupt (Default Template): A basic FIFO queue managed template with all auto interrupt settings disabled is provided. The Interrupt button is enabled. (Row 3 of Table 1 set to 'Y'). All jobs set by this template will be treated as equal in priority and marking will occur on a first in first out basis with the exception of error handling marking.
2) Priority Based Favoring Copy without Priority Based Interrupt: A priority based template favoring Copy/Scan & other walkup operations which also excludes the use of IOT interrupt job management is provided.
3) Priority Based Favoring Fax without Priority Based Interrupt: A priority based template favoring Fax incoming jobs followed by walkup jobs and then Print Jobs is provided. This template will not preferably include interrupt control of job management.
4) Priority Based Favoring Net Print without Priority Based Interrupt: A priority based template favoring Net Print jobs followed by walkup jobs and then by Fax direct print jobs is provided. The template will preferably not include interrupt control of job management.
5) Priority Based Favoring Copy/Scan with Job Type Interrupt Capability: A priority based template favoring Copy/Scan walk up jobs with interrupt settings enabled is provided.
6) Priority Based Favoring Print with Job Type Interrupt Capability: A priority based template favoring Copy/Scan walk up jobs with interrupt settings enabled is provided.

TABLE 2

Error conditions which demand resource(s)

| Error Conditions That Demand Resource | param. | Copy Job Print | Auto Report Print | Net Print & ESS MB Print | Fax MB Print Local Report Print | Fax Print |
|---|---|---|---|---|---|---|
| If Fax memory is full, Interrupt and Print Immediately | Y/N | Y | Y | Y | Y | n/a |

This condition or parameter arises when the memory for accommodating Fax Print is exceeded by a preselected threshold. In particular, if upon receipt of a Fax job, the Fax While the prior art has addressed the concept of interrupting an interrupt job with another interrupt job as well as the concept of printing one type of job (e.g. a copy job)

before another type of job (e.g. print job), a problem arises when a system seeks to prioritize a large group of jobs including many job types. Referring to FIG. 8, an embodiment in which a priority-based queue management scheme for determining the next job to obtain a system's resource is discussed. In the illustrated embodiment of FIG. 8, a job's priority is based on the service that created the job. Preferably, the SA/KO sets the relative priority of each service from which a job is obtained in a queue.

As an overview, when a job requires a system resource, e.g. the scanner or printer, the job is placed in the job queue of the corresponding resource. When the resource is able to begin processing of a job, the resource obtains the highest priority job from its queue.

The priority-based queue management scheme is particularly useful in the area of job interrupt. The table of FIG. 8 (also see Table 1 above) specifies when the job of one service can interrupt the job of another service. This view of interruption may be referred to as interruptability. The SA/KO preferably develops the interruptability matrix of FIG. 8, which matrix sets forth the interruptability relationships between jobs of a plurality of service types. The interruptability scheme of the presently described embodiment incorporates the following concepts:

1) The SA/KO specifies the relative priority of each job (See Table 1 above) developed by a service (e.g. the priority of a "Remote File" (FIG. 8) is relatively high since it can interrupt the processing of six other job types);
2) The SA/KO specifies the interruptability matrix for the jobs (e.g. copy job can interrupt a print job);
3) When a job is created within the printing system 10 (FIG. 1), the job is assigned a priority based on service type;
4) Each system resource maintains a queue of jobs for the resource (in one example, the jobs in each queue are ordered according to job priority);
5) When a system resource is ready to process a job, the resource processes the job with the highest priority in its queue;
6) If a resource is processing a job and a new job requires the resource then
   if (the new job's priority is greater than the current job's priority) and
     (the current job is not an "interrupt" job) then
       if (the new job's service can interrupt the current job's service)
       then (the new job interrupts the current job)
       else (add the new job to the resource's job queue)
     else (add the new job to the resource's job queue); and If the resource has an interrupted job and the resource completes processing all higher priority interrupting jobs, the resource resumes the proceeding of interrupted jobs.

Referring again to FIG. 8, a few comments regarding the table thereof are in order. First, the matrix shows the interruptablity of one service's job by another service's job. An interruptability decision exists when a job is using a system's resource and another higher priority job requires that resource. Second, a "yes" in a table entry indicates that the current job of a service (columns) can be interrupted by a higher priority job of the second service (rows). It should be appreciated that the matrix of FIG. 8 is particularly useful in ordering jobs in a queue in that the relative priority of job type follows directly from the matrix. For example, a Remote File has the highest priority, in the example of FIG. 8, and will preferably be given higher priority in processing than a Copy Job.

Referring now to FIGS. 9 and 10, another embodiment for prioritizing one or more jobs in a queue is discussed. Three concepts are considered by that embodiment:

The first concept relates to the above-discussed concept of enabling the KO/SA to specify a job's priority based on its input source or service (e.g., scanner application, ESS or network source or marking service). For each service/application/input source, the KO/SA preferably assigns a priority value (e.g., ranging from 0 to 50). In an example of the first concept, a system is configured with three inputs (scanner, net and fax). To provide scanner jobs with a greater priority than fax or net jobs, the KO/SA might value the inputs as follows:

fax: 10; net: 10; and scanner: 30

The second concept provides the KO/SA with the ability to increment a job's priority (beyond that of the first concept above) on the basis of the "reason for" or "method of" creating the job. In one aspect of the second concept, the printing system 10 would support priority valuation for two levels of interrupt, namely "interrupt1" and "interrupt2". In one example, a scan or copy job, designated as "Print Now", would be treated as an interrupt1 job, while a net job with interrupt priority would be treated as an interrupt2 job. It will be understood that in an alternative approach which gives higher priority to jobs from the network, net jobs would be designated as interrupt1 jobs. In this one example, an interrupt1 job would be assigned a relatively high value (e.g., a value of 50), while and interrupt2 job would be assigned a relatively low value (e.g., a value of 20). In accordance with the first and second concepts, the respective values of an interrupt scan job, a scan job, an interrupt net job, and a net job would be 50, 30, 20, and 10.

The third concept provides for a preselected incremental increase to be added to the value of each queued job after a preselected time period. As will be appreciated, by reference to Table 1 above, the third concept contemplates adding an incremental value to each job value every time the job is interrupted by another job. In the third concept, the user preferably specifies two values, namely a time priority increment (ranging, for example, from 0–50) and a time interval (ranging from, for example, from 1–30 minutes). If no increment is desired, then the KO/SA specifies the time priority increment as equaling zero. In the embodiment of the third concept, a job value is not to exceed a preselected ceiling (e.g., a ceiling or maximum value of 100).

Referring specifically to FIGS. 9 and 10, an example, illustrating the three concepts discussed above, is provided. As will be noted, eventually, due to incrementing, Job C will achieve a level at which it cannot be interrupted by even a relatively high priority job.

Three examples of queue management schemes are provided below. In each example, the reader is provided with the following sections:

1) Queue Management Control;
2) System Command Flow;
3) Table of System Queue Commands;
4) Queue Display Views; and For each example it is recommended that the reader begin by reading the Queue Management Control section in conjunction with the Queue Display Views to obtain a comprehensive description of how the mark queue is being filled in accordance with at least one of the above-described contention management schemes.

The following is an overview of the above-indicated sections:

Queue Management Control: This explains how the queue will work based on a specific contention table configuration and a specific order of job types entering the queue. A corresponding contention priority table, which is configured in a way to illustrate certain feature impacts of table set up, is provided for each Example.

System Command Flow: This section illustrates a time sequence (snapshots) of commands between major software system modules. The commands reference a corresponding command table. The commands, while conceptual in nature, are exemplary of those commands employed in implementing the queue management and display for a typical MF system.

Queue Display Views: This shows pictorially the queue as it might look at various moments in time (snapshots). The views are similar to but not the same as ones that actual users of the queue might see. For example, the actual queue viewer would not see 'priority' of job. The Job ID might be the users name and net ID. One use of this section to a reader would be to show how the jobs are ordered in the queue based on the settings in the contention priority algorithm of Table 3.

EXAMPLE 1 ("Sequence 1")

Queue Management Control

Time Snap Shot: 1:01:00 pm

At 1:00, a Net Print Job entered the queue which was at that moment empty. The ESS began decomposing the job and the queue was updated to reflect the new job and status. A Net Mail Job arrived at 1:01 and was queued behind the Net Print Job because it was the same priority.

Time Snap Shot: 1:02:01 pm

A System Error Report Job was placed by the system queue behind the Net Mail Job. The System Error Report Job had a lower assigned priority than the Net Mail Job and was ordered behind it. The job in the top of the queue (active) job was now printing.

Time Snap Shot: 1:02:31 pm

A Copy Job arrived and bypassed the other lower priority jobs in the queue. It did not interrupt the job which was printing because the Contention table item 4 specified that a Net Print Job would not be interrupted in the IOT by a job of higher priority. Note: the System Error Report did not advance but remains in last place position in the queue based on its priority assignment. This is desirable because the customer does not want the Report Interrupting or bypassing the user jobs.

Time Snap Shot: 1:03:00 pm

In the preceding minute, the Net Print Job finished printing. The Copy Job took control of the IOT & began printing. The Net Mail is at this moment, next to be printed. System Report is second to be printed.

Time Snap Shot: 1:03:30 pm

Before the Copy Job could finish printing, an Authorized User Job (AU) arrived at 1:03:10 and immediately bypassed the low priority jobs in the queue. Notice that AU Job is at the highest priority level. The AU Job also interrupted the Copy Job because the Contention table Authorized User Interrupt Setting for Copy Job Print was set to 'Yes' (see status column) If it had been set to 'No' then the AU Job would have bypassed all queued jobs and waited for the Copy Job to finish printing. The AU Job would have then gone next before any other jobs. In that example, if another AU had come in to the system just after the AU Job, it would also have been promoted to the top of the IOT queue but just behind the first AU Job. Note: The System Error Report Job is still sitting at the bottom of the queue. But this is the way the user wishes to set up this table. If the user felt the Report Job was more important, s/he could rearrange priority of the queue via the contention table to force Report Jobs to be printed with less delay.

Time Snap Shot: 1:04:00 pm

Nothing new has arrived, the AU Job was completed and the Copy Job has regained the IOT and is printing.

Time Snap Shot: 1:05:00 pm

The Copy Job finished printing, the Net Mail Job begins printing.

Time Snap Shot: 1:05:30 pm

The System Error Report is printing out. Since it cannot be interrupted by any other jobs except AU Jobs, it will probably finish printing this time without delay.

End of Sequence1 (Queue Management Control)

System Command Flow (for Sequence 1)

Time Snap Shot: 1:01:00 pm

1:00:00, The Queue Manager (QM) has received information from the ESS (Electronic Subsystem) that a Net Print Job has arrived and is waiting to be run. (ES-QM1)

1:00:01, The QM commands the ESS to begin printing the Job. (QM-ES1)

1:00:02, The QM sends appropriate display information to the user display to show the queued job status. (QM-UI1)

1:01:00, ESS informs the QM that a Net Mail Job is ready to begin printing. (ES-QM1)

The QM sends appropriate display information to the user display (QM-UI1)

—End Time Snap Shot 1:01:00—

Time Snap Shot: 1:02:01 pm

1:02:00, Auto Report Job is reported to the QM by MFSYS. (Multifunctional System) (ES-QM4)

1:02:01, The QM sends appropriate display information to the user display to update the queued job status. (QM-UI1)

—End Time Snap Shot 1:02:01—

Time Snap Shot: 1:02:31 pm

1:02:30, MFSYS reports a Copy Job is ready to the QM. (MF-QM1)

1:02:31, QM updates the user display to show the new job order. (QM-UI1)

—End Time Snap Shot 1:02:31—

Time Snap Shot: 1:03:00 pm

1:02:50, The ESS sends a report to QM that the Net Job has finished printing. (ES-QM2)

1:02:51, QM requests MFSYS to begin printing the Copy Job. (QM-MF1)

1:03:00, QM sends to the user display the queue updates. (QM-UI1)

—End Time Snap Shot 1:03:00—

Snap Shot 1:03:30 pm

1:03:10, ESS informs QM that a Net Print Authorized User has arrived. (ES-QM1)

1:03:11, QM sends MFSYS interrupt command for the Copy Job. (QM-MF4).

1:03:12 QM tells ESS to begin the AU Job (QM-ES1)

1:03:13 QM tells user display updates to queue. (QM-UI1)

—End Time Snap Shot 1:03:30—

Snap Shot 1:04:00 pm

1:03:50 ESS informs QM that AU Job has finished. (ES-QM2)

1:03:51 QM tells MFSYS to restart interrupted Copy Job. (QM-MF6)

1:03:52 QM sends update of display to user display. (QM-UI1)

1:04:00 No operation

—End Time Snap Shot 1:04:00—

Snap Shot 1:05:00 pm

1:04:35 MFSYS informs QM that Copy Job has finished. (MF-QM 5)

1:04:36 QM tells ESS to begin Net Mail Job. (QM-ES1)

1:04:36 QM sends display data to user display. (QM-UI1)

1:05:00 No operation

—End Time Snap Shot 1:05:00—

Snap Shot 1:05:30 pm

1:05:15 ESS informs QM that job has finished. (ES-QM2)

1:05:16 QM tells MFSYS to begin Auto Error report Job (QM-ES1)

1:05:17 QM sends update to display screen. (QM-UI1)

1:05:30 No Operation

—End Time Snap Shot 1:05:30—

End of System Command Flow for Sequence 1

| System Queue Commands | | | |
|---|---|---|---|
| Command | Original to Destination | Type | Command Function |
| ES-QM1 | ESS to Queue Manager | info | job is ready to print |
| ES-QM2 | ESS to Queue Manager | info | job has finished print |
| QM-ES1 | Queue Manager to ESS | com | start printing job |
| QM-ES2 | Queue Manager to ESS | com | interrupt job |
| QM-ES3 | Queue Manager to ESS | com | restart interrupted job |
| QM-ES4 | Queue Manager to ESS | com | terminate job |
| QM-UI1 | Queue Manager to UI | com | update display |
| QM-MF1 | Queue Manager to MFSYS | com | start copy job |
| QM-MF2 | Queue Manager to MFSYS | com | start fax print job |
| QM-MF3 | Queue Manager to MFSYS | com | start fax mail job |
| QM-MF4 | Queue Manager to MFSYS | com | start auto report job |
| QM-MF5 | Queue Manager to MFSYS | com | interrupt job |
| QM-MF6 | Queue Manager to MFSYS | com | restart interrupted job |
| QM-MF7 | Queue Manager to MFSYS | com | terminate job |

| System Queue Commands | | | |
|---|---|---|---|
| Command | Original to Destination | Type | Command Function |
| MF-QM1 | MFSYS to Queue Manager | info | copy job is ready |
| MF-QM2 | MFSYS to Queue Manager | info | fax print job is ready |
| MF-QM3 | MFSYS to Queue Manager | info | fax mail job is ready |
| MF-QM4 | MFSYS to Queue Manager | info | auto report job is ready |
| MF-QM5 | MFSYS to Queue Manager | info | IOT Job has Completed |

Key to Command Codes:

QM = Queue Manager software module

ES = ESS software module

MF = MFSYS software module

1–9 = command number numeric codes

Type Abbreviations:

com = command info = informational message

| Queue Display Views for Sequence 1 | | | | |
|---|---|---|---|---|
| Job ID | Job Type | Job Priority | Status | Time in Queue |
| Snap Shot 1 1:01:00 pm | | | | |
| 1 | Net Print | 5 | printing | 1:00:00 |
| 2 | Net Mail | 5 | queued | 1:01:00 |
| Snap Shot 2 1:02:01 pm | | | | |
| 1 | Net Print | 5 | printing | 1:00:00 |
| 2 | Net Mail | 5 | queued | 1:01:00 |
| 3 | System Report | 6 | queued | 1:02:00 |
| Snap Shot 3 1:02:31 pm | | | | |
| 1 | Net Print | 5 | printing | 1:00:00 |
| 4 | Copy Job | 3 | queued | 1:02:30 |
| 2 | Net Mail | 5 | queued | 1:01:00 |
| 3 | System Report | 6 | queued | 1:02:00 |
| Snap Shot 4 1:03:90 pm | | | | |
| 4 | Copy Job | 3 | printing | 1:02:30 |
| 2 | Net Mail | 5 | queued | 1:01:00 |
| 3 | System Report | 6 | queued | 1:02:00 |
| Snap Shot 5 1:03:30 pm | | | | |
| 5 | Net Print AU | 1 | printing | 1:03:10 |
| 4 | Copy Job | 3 | Interrupt | 1:02:30 |
| 2 | Net Mail | 5 | queued | 1:01:00 |
| 3 | System Error Report | 6 | queued | 1:02:00 |
| Snap Shot 6 1:04:00 pm | | | | |
| 4 | Copy Job | 3 | Interrupt | 1:02:30 |
| 2 | Net Mail | 5 | queued | 1:01:00 |
| 3 | System Error Report | 6 | queued | 1:02:00 |
| Snap Shot 7 1:05:00 pm | | | | |
| 2 | Net Mail | 5 | printing | 1:01:00 |
| 3 | System Error Report | 6 | queued | 1:02:00 |
| Snap Shot 8 (last) 1:05:30 pm | | | | |
| 3 | System Error Report | 6 | printing | 1:02:00 |

CONTENTION PRIORITY ALGORITHM PRESETS (IOT)

| # | | param. | Copy Job Print | Auto Report Print | Print & ESS MB Print | FAX MB Print Local Report Print | Fax Print |
|---|---|---|---|---|---|---|---|
| 1 | Authorized User Override (priority 1) | Y/N | Y | Y | Y | Y | Y |
| 2 | Maximum number of Times a job can be interrupted | 1–99, no limit | 3 | 3 | 3 | 3 | 3 |
| 3 | Allow interrupt by walk up user (if walk up user is the same or a higher priority) | Y/N | Y | N | N | N | N |
| 4 | Allow Job type in column to be interrupted by higher priority Job types? | Y/N | N | N | N | N | N |
| 5 | Maximum Length of TIme a Job can be in the queue | 0.5–24.0 hr | 1 | ← | ← | ← | ← |
| 6 | Job Type Priority (2 = high, 6 = lowest) | 2–6 | 3 | 6 | 5 | 4 | 2 |

Key: n/a = Not Applicable
← = All of row set by leftmost column

KO/SA Contention Presets

EXAMPLE 2 ("Sequence 2")

Queue Management Control

Time Snap Shot: 1:01:00 pm

At 1:00, a Net Print Job entered the queue which was at that moment empty. The ESS began decomposing the job and the queue was updated to reflect the new job and status. A Fax Error Log Job (auto generated) arrived at 1:00:30 and was queued behind the Net Print Job because it was lower priority and it arrived later than the Net Print Job.

Time Snap Shot: 1:02:00 pm

A Net Mail Job arrived at 1:01:20 and because it was a higher priority than the Fax Error Job, queue manager bypassed Fax Error Job to place it just after the Net Print Job. The Net Mail Job did not interrupt the Net Print Job because it was the same priority and it had arrived later than the Net Print Job.

Time Snap Shot 1:02:30 pm

A Fax Print Job, arrived and bypassed the other lower priority jobs in the queue. It also interrupted the Net Print Job which was still printing. In this example, the Contention Table allows higher priority jobs to not only move to the top of the queue but also to interrupt lower priority jobs. (See entry row #4 in Contention Table) The Net Print Job is delayed in interrupt while the Fax Print Job completes.

Time Snap Shot: 1:03:00 pm

At 1:02:50 the Fax Print Job finished printing, The Net Print Job resumed printing.

Time Snap Shot: 1:03:30 pm

At 1:03:20 a Fax Mailbox Job arrived at the queue manager and because it was a high priority job, it bypassed the queue and interrupted the current Net Print Job (second Print Job Interruption). The maximum number of interrupts for Net Print Jobs was set to two (see row 2 of Contention Table). Job cannot be interrupted again by a higher priority job (except AU in this case, see row Time Snap Shot: 1:04:00 pm Nothing new has arrived, the Fax Mailbox Job was completed and the Net Job has regained the IOT and is printing.

Time Snap Shot: 1:05:00 pm

The Copy Job arrived at 1:04:50, it bypassed the queued jobs of lower priority however, it could not interrupt the Net Print Job because the Net Print Job's interrupt limit had been exceeded. The Copy Job was placed at the top of the queue behind the printing Net Job.

Time Snap Shot: 1:05:30 pm

The Net Print Job is finished printing. The Copy Job is now printing and will be followed (per this moments forecast) by the Net Mail Job and the Fax Error Log Job.

End of Sequence 2 (Queue Management Control)

System Command Flow (for Sequence 2)

Time Snap Shot: 1:01:00 pm

1:00:00, The Queue Manager (QM) has received information from the ESS that a Net Print Job has arrived and is waiting to be run. (ES-QM1)

1:00:01, The QM after determining that no other jobs exist on the system, commands the ESS to begin printing the Job. (QM-ES1)

1:00:02, The QM sends appropriate display information to the user display to show the queued job status. (QM-U11)

1:00:30, MFSYS informs the QM that Fax Error Report Job is ready. (MF-QM4)

1:00:31 The QM sends appropriate display information to the user display to show the queued job status. (QM-UI1)

—End Time Snap Shot 1:01:00—

Time Snap Shot: 1:02:00 pm

1:01:20, Net MailBox is reported to the QM by ESS. (ES-QM1)

1:01:21, The QM sends appropriate display information to the user display to update the queued job status. (QMUI1)

1:02:00 No Operation

—End Time Snap Shot 1:02:00—

Time Snap Shot: 1:02:30 pm

1:02:01, MFSYS reports to QM a Fax Print Job is ready. (MF-QM2)

1:02:02, QM commands ESS to interrupt the Net Print Job. (QM-ES2)

1:02:03, QM commands MFSYS to start the Fax Print Job. (QM-MF2)

1:02:04, QM sends display update to user display. (QM-UI1)

1:02:30 No Operation

—End Time Snap Shot 1:02:30—

Time Snap Shot: 1:03:00 pm

1:02:50, The MFSYS sends a report to QM that (Fax) Job is done. (MF-QMS)

1:02:51, QM requests ESS to restart printing the Net Print Job. (QM-ES3)

1:02:52, QM sends to the user display the queue updates. (QM-UI1)

1:03:00 No Operation.

—End Time Snap Shot 1:03:00—

Snap Shot 1:03:30 pm

1:03:20, MFSYS informs QM that a Fax Mail Box Job is ready to print. (MF-QM3)

1:03:21, QM sends ESS interrupt command for the Net Print Job. (QM-ES2).

1:03:22 QM commands MFSYS to begin the Fax Mail Box Job. (QM-MF3)

1:03:23 QM updates user display. (QM-UI1)

1:03:30 No Operation

—End Time Snap Shot 1:03:30—

Snap Shot 1:04:00 pm

1:03:50 MFSYS informs QM that the Fax Mail Box Job is done. (MF-QM5)

1:03:51 QM commands ESS to restart interrupted Print Job. (QM-ES3)

1:03:52 QM sends update of display to user display. (QM-UI1)

1:04:00 No operation

—End Time Snap Shot 1:04:00—

Snap Shot 1:05:00 pm

1:04:50 MFSYS informs QM that a Copy Job is ready. (MF-QM1)

1:04:51 QM sends display update data to user display. (QM-UI1)

1:05:00 No operation

—End Time Snap Shot 1:05:00—

Snap Shot 1:05:30 pm

1:05:15 ESS informs QM that Net Print Job has finished. (ES-QM2)

1:05:16 QM commands MFSYS to begin Copy Job. (QM-MF1)

1:05:17 QM sends display update data to user display. (QM-UI1)

1:05:30 No operation

—End Time Snap Shot 1:05:30—

End of System Command Flow for Sequence 2

| System Queue Commands | | | |
| --- | --- | --- | --- |
| Command | Original to Destination | Type | Command Function |
| ES-QM1 | ESS to Queue Manager | info | job is ready to print |
| ES-QM2 | ESS to Queue Manager | info | job has finished print |
| QM-ES1 | Queue Manager to ESS | com | start printing job |
| QM-ES2 | Queue Manager to ESS | com | interrupt job |
| QM-ES3 | Queue Manager to ESS | com | restart interrupted job |
| QM-ES4 | Queue Manager to ESS | com | terminate job |
| QM-UI1 | Queue Manager to UI | com | update display |
| QM-MF1 | Queue Manager to MFSYS | com | start copy job |
| QM-MF2 | Queue Manager to MFSYS | com | start fax print job |
| QM-MF3 | Queue Manager to MFSYS | com | start fax mail job |
| QM-MF4 | Queue Manager to MFSYS | com | start auto report job |
| QM-MF5 | Queue Manager to MFSYS | com | interrupt job |
| QM-MF6 | Queue Manager to MFSYS | com | restart interrupted job |
| QM-MF7 | Queue Manager to MFSYS | com | terminate job |
| MF-QM1 | MFSYS to Queue Manager | info | copy job is ready |
| MF-QM2 | MFSYS to Queue Manager | info | fax print job is ready |
| MF-QM3 | MFSYS to Queue Manager | info | fax mail job is ready |
| MF-QM4 | MFSYS to Queue Manager | info | auto report job is ready |
| MF-QM5 | MFSYS to Queue Manager | info | IOT Job has Completed |

Key to Command Codes:
QM = Queue Manager software module
ES = ESS software module
MF = MFSYS software module
1–9 = command number numeric codes
Type Abbreviations:
com = command
info = informational message

| Queue Display Views for Sequence 2 | | | | |
| --- | --- | --- | --- | --- |
| Job ID | Job Type | Job Priority | Status | Time in Queue |
| Snap Shot 1 1:01:00 pm | | | | |
| 1 | Net Print | 5 | printing | 1:00:00 |
| 2 | Fax Error Log (Auto) | 6 | queued | 1:00:30 |
| Snap Shot 2 1:02:00 pm | | | | |
| 1 | Net Print | 5 | printing | 1:00:00 |
| 3 | Net Mail | 5 | queued | 1:01:20 |
| 2 | Fax Error Log (Auto) | 6 | queued | 1:00:30 |
| Snap Shot 3 1:02:30 pm | | | | |
| 4 | Fax Print | 2 | printing | 1:02:01 |
| 1 | Net Print | 5 | interrupt | 1:00:00 |
| 3 | Net Mail | 5 | queued | 1:01:00 |
| 2 | Fax Error Log (Auto) | 6 | queued | 1:00:30 |
| Snap Slot 4 1:03:00 pm | | | | |
| 1 | Net Print | 5 | printing | 1:00:00 |
| 3 | Net Mail | 5 | queued | 1:01:00 |
| 2 | Fax Error Log (Auto) | 6 | queued | 1:00:30 |
| Snap Shot 5 1:03:30 pm | | | | |
| 5 | Fax MailBox | 3 | printing | 1:03:20 |
| 1 | Net Print | 5 | interrupt | 1:00:00 |
| 3 | Net Mail | 5 | queued | 1:01:00 |
| 2 | Fax Error Log (Auto Rep) | 6 | queued | 1:00:30 |

-continued

Queue Display Views for Sequence 2

| Job ID | Job Type | Job Priority | Status | Time in Queue |
|---|---|---|---|---|
| Snap Shot 6 1:04:00 pm | | | | |
| 1 | Net Print | 5 | printing | 1:00:00 |
| 3 | Net Mail | 5 | queued | 1:01:00 |
| 2 | Fax Error Log (Auto Rep) | 6 | queued | 1:00:30 |
| Snap Shot 7 1:05:00 pm | | | | |
| 1 | Net Print | 5 | printing | 1:00:00 |
| 6 | Copy Print | 3 | queued | 1:04:50 |
| 3 | Net Mail | 5 | queued | 1:01:00 |
| 2 | Fax Error Log (Auto Rep) | 6 | queued | 1:00:30 |
| Snap Shot 8 1:05:30 pm | | | | |
| 6 | Copy Print | 3 | queued | 1:04:50 |
| 3 | Net Mail | 5 | queued | 1:01:00 |
| 2 | Fax Error Log (Auto Rep) | 6 | queued | 1:00:30 |

Time Snap Shot: 2:01:00 pm

At sometime between 1:02:30 and this queue snap shot, the Net Print Job was released and printed by the job owner. The Held Job kept its place at the top of the queue (just before printing) until it was released. All other jobs entering the system bypassed the held job until the time it was released. At 1:18:00 a Net Print Timer Release Job (i.e., a Net Job releasable after a preset time period has elapsed) entered the queue.

At the time of this snapshot, the Fax Error Log Job has been in the queue an hour. The Contention Table specified in this example says that queued jobs will not remain in the queue for more than an hour before being elevated to 'need' to print status. The elevated job would not interrupt a higher priority job, but would print before any other job (even higher priority jobs) bypassed it. Again, an AU Job has the highest priority of any job, even jobs that have been elevated by the system. (Note: job priority will not necessarily be visible to users of the queue)

CONTENTION PRIORITY ALGORITHM PRESETS (IOT)

| # | | param. | Copy Job Print | Auto Report Print | Print & ESS MB Print | FAX MB Print Local Report Print | Fax Print |
|---|---|---|---|---|---|---|---|
| 1 | Authorized User Override (priority 1) | Y/N | Y | Y | Y | Y | Y |
| 2 | Maximum number of Times a job can be interrupted | 1–99, no limit | 2 | 2 | 2 | 2 | 2 |
| 3 | Allow interrupt by walk up user (if walkup user is the same or a higher priority) | Y/N | Y | N | Y | Y | N |
| 4 | Allow Job type in column to be interrupted by higher priority Job types? | Y/N | Y | Y | Y | Y | Y |
| 5 | Maximum Length of Time a Job can be in the queue | 0.5-24.0 hr | 1 | ← | ← | ← | ← |
| 6 | Job Type Priority (2 = high, 6 = lowest) | 2–6 | 3 | 6 | 5 | 3 | 2 |

Key: n/a = Not Applicable
← = All of row set by leftmost column

KO/SA Contention Presets

EXAMPLE 3 ("Sequence 3")

Queue Management Control

Time Snap Shot: 1:01:00 pm

At 1:00, a Net Print Job entered the queue which was at that moment empty. The queue was updated to reflect the new job and status. A Fax Error Log Job (auto generated) arrived at 1:00:30 and was queued behind the Net Print Job because it was lower priority and it arrived later than the Net Print Job.

Time Snap Shot: 1:02:00 pm

A Net Print (held) Job arrived at 1:01:20 and because it was a higher priority than the Fax Error Log Job, queue manager by passed Fax Error Log to place it just after the Net Print Job.

Time Snap Shot: 1:02:30 pm

The Net Print Job finished printing at 1:02:05. A Copy Job arrived a 1:02:10, bypassed the lower priority and held jobs, and began printing. Another Net Job arrived at 1:02:25 and was queued ahead of the Fax Error Log Job.

Time Snap Shot: 9:00:00 pm (not in sequence 3 table)

The timed release job continued to remain at the bottom of the queue until the timer expired at 9:00:00 pm. At that time it was released into the bottom of the queue. There were no other higher priority jobs in the system at 9:00 pm so the timer job began printing.

End of Sequence 3 (Queue Management Control)
System Command Flow (for Sequence 3)
  Snap Shot: 1:01:00 pm
    1:00:00, The Queue Manager (QM) has received information from the ESS that a Net Print has arrived and is waiting to be run. (ES-QM1)
    1:00:01, QM updates the user display. (QM-UI1)
    1:00:30, MFSYS informs QM that an error log (Auto) report is ready. (MF-QM4)
    1:00:31, QM updates the user display. (QM-UI1)
    1:01:00, No Operation —End Time Snap Shot 1:01:00—

Snap Shot 1:02:00 pm
  1:01:20 ESS informs QM that a Net Print (Held Job) is ready. (ES-QM1)

1:01:21 QM updates the user display. (QM-UI1)
1:02:00 No Operation

—End Time Snap Shot 1:02:00—

Snap Shot 1:02:30 pm
1:02:05 ESS informs QM that the Net Print Job is done. (ES-QM2)
1:02:06 QM updates the display. (QM-UI1)
1:02:07 MFSYS informs QM that Copy Job is ready. (MF-QM1)
1:02:08 QM commands MFSYS to start Copy Job. (QM-MF1)
1:02:25 ESS informs QM that a Net Print Job is ready. (ES-QM1)
1:02:26 QM updates display. (QM-UI1)
1:02:30 No Operation —End Time Snap Shot 1:02:30—

Snap Shot (final) 2:01:00 pm
1:02:32 MFSYS informs QM that Copy Job is done. (MF-QM5)
1:02:33 QM updates display. (QM-UI1)
1:02:34 QM commands ESS to begin the Net Print Job. (QM-ES1)
1:02:50 ESS informs QM that Net Print Job is done. (ES-QM2)
1:02:51 QM updates display. (QM-UI1)
1:02:52–1:05:00 Other jobs arrive on system and are processed.
1:05:00 The user of the held job releases it from hold. (IOT is occupied)
1:05:24 ESS informs QM that a job has completed. (ES-QM2)
1:05:25 QM commands ESS to begin printing the held job. (QM-ES1)
1:05:26 QM updates display. (QM-UI1)
1:05:27–2:01:00 Many jobs handled by the system. Fax Error Log Job never has an opening to print because higher priority jobs are bypassing it.
2:01:00 QM updates display to show Fax Error Log Job as 'next' to print. (QM-UI1)
2:01:22 ESS informs QM that a job is done. (ES-QM1)
2:01:23 QM commands MFSYS to start printing the Fax Error Log Job. (QM-QM4)

End of System Command Flow for Sequence 3

System Queue Commands

| Command | Original to Destination | Type | Command Function |
|---|---|---|---|
| ES-QM1 | ESS to Queue Manager | info | job is ready to print |
| ES-QM2 | ESS to Queue Manager | info | job has finished print |
| QM-ES1 | Queue Manager to ESS | com | start printing job |
| QM-ES2 | Queue Manager to ESS | com | interrupt job |
| QM-ES3 | Queue Manager to ESS | com | restart interrupted job |
| QM-ES4 | Queue Manager to ESS | com | terminate job |
| QM-UI1 | Queue Manager to UI | com | update display |
| QM-MF1 | Queue Manager to MFSYS | com | start copy job |
| QM-MF2 | Queue Manager to MFSYS | com | start fax print job |
| QM-MF3 | Queue Manager to MFSYS | com | start fax mail job |
| QM-MF4 | Queue Manager to MFSYS | com | start auto report job |
| QM-MF5 | Queue Manager to MFSYS | com | interrupt job |
| QM-MF6 | Queue Manager to MFSYS | com | restart interrupted job |
| QM-MF7 | Queue Manager to MFSYS | com | terminate job |
| MF-QM1 | MFSYS to Queue Manager | info | copy job is ready |
| MF-QM2 | MFSYS to Queue Manager | info | fax print job is ready |
| MF-QM3 | MFSYS to Queue Manager | info | fax mail job is ready |
| MF-QM4 | MFSYS to Queue Manager | info | auto report job is ready |
| MF-QM5 | MFSYS to Queue Manager | info | IOT Job has Completed |

Key to Command Codes:
QM = Queue Manager software module
ES = ESS software module
MF = MFSYS software module
1–9 = command number numeric codes
Type Abbreviations:
com = command
info = informational message

Queue Display Views for Sequence 3

| Job ID | Job Type | Job Priority | Status | Time in Queue |
|---|---|---|---|---|
| \multicolumn{5}{c}{Snap Shot 1 1:01:00 pm} | | | | |
| 1 | Net Print | 5 | printing | 1:00:00 |
| 2 | Fax Error Log (Auto Rep) | 6 | queued | 1:00:30 |
| \multicolumn{5}{c}{Snap Shot 2 1:02:90 pm} | | | | |
| 1 | Net Print | 5 | printing | 1:00:00 |
| 3 | Net Print (Held) | 5 | held | 1:01:20 |
| 2 | Fax Error Log (Auto Rep) | 6 | queued | 1:00:30 |
| \multicolumn{5}{c}{Snap Shot 3 1:02:30 pm} | | | | |
| 4 | Copy Print | 3 | printing | 1:02:10 |
| 3 | Net Print (Held) | 5 | held | 1:01:20 |
| 5 | Net Print | 5 | queued | 1:02:25 |
| 2 | Fax Error Log (Auto Rep) | 6 | queued | 1:00:30 |
| \multicolumn{5}{c}{Snap Shot 4 (final) 2:01:00 pm} | | | | |
| 56 | Net Print | 5 | printing | 1:57:40 |
| 2 | Fax Error Log (Auto Rep) | 6 | next | 1:00:30 |
| 57 | Net Print | 5 | queued | 1:57:50 |
| 58 | Net Print | 5 | queued | 1:58:00 |
| 59 | Net Print | 5 | queued | 1:59:10 |
| 18 | Net Print (Timer release) | 5 | queued | 1:18:00 |

CONTENTION PRIORITY ALGORITHM PRESETS (IOT)

| # | | param. | Copy Job Print | Auto Report Print | Print & ESS MB Print | FAX MB Print Local Report Print | Fax Print |
|---|---|---|---|---|---|---|---|
| 1 | Authorized User Override (priority 1) | Y/N | Y | Y | Y | Y | Y |
| 2 | Maximum number of Times a job can be interrupted | 1–99, no limit | 2 | 2 | 2 | 2 | 2 |
| 3 | Allow intertupt by walk up user (if walkup user is the same or a higher priority) | Y/N | Y | N | Y | Y | N |
| 4 | Allow Job type in column to be interrupted by higher priority Job types? | Y/N | Y | Y | Y | Y | Y |
| 5 | Maximum Length of Time a Job can be in the queue | 0.5–24.0 hr | 1 | ← | ← | ← | ← |
| 6 | Job Type Priority (2 = high, 6 = lowest) | 2–6 | 3 | 6 | 5 | 3 | 2 |

Key: n/a = Not Applicable
← = All of row set by leftmost column

KO/SA Contention Presets

Numerous features of the above-described embodiments will be appreciated by those skilled in the art:

First, queue management varying as a function of job or user priority is provided. In one example, a value is assigned to a job on the basis of either the service at which the job was originally developed or the user who developed the job. In this way a priority job can be placed into a queue in accordance with a preassigned priority or the authority level of the job originator. By considering the authority level of the job originator, a remote interrupt can be initiated. That is, a remote user or service with a sufficient level of authority may demand that his/her job be printed immediately at a remote printing machine.

Second, queue management can be facilitated through use of job priority table or matrix in which the priority of a given job type, relative to other job types, is preset as a function of the service at which the given job was developed. The matrix is particularly effective in addressing interruptability considerations. For example, the matrix can be used to determine whether a first job type should be allowed to interrupt the processing of a second job type.

Third, the queue management style of the preferred embodiment prevents a situation in which a job, due to its service origin, gets "stuck in the queue. In one preferred approach each queued job is assigned a value. As the job sets in the queue, its value increases to the extent that it must, within a selected time period, be processed, notwithstanding the original priority of the job. Alternatively, the value can be increased each time it is interrupted by another job.

Finally, the system can be programmed to automatically interrupt a job in process when an incoming job requires certain memory space and the current available memory space is unable to accommodate such requirement. This capability is particularly useful with respect to an incoming fax job since a shortage of memory, due to the current processing of one or more other jobs, can lead to a loss of a portion of the incoming fax job.

What is claimed is:

1. A method of managing the processing of a plurality of jobs in a queue of a multifunctional printing system in which a first job and a second job are stored in the queue for processing, the multifunctional printing system including a controller for facilitating placement of the jobs into the queue, the first job being developed at a first service and the second job being developed at a second service, comprising:

a) determining, with the controller, that the first job was developed at the first service and that the second job was developed at the second service;

b) in response to said determining of (a), assigning a first value to the first job and a second value to the second job, the first and second values varying respectively in magnitude as a function of the first and second services;

c) placing the first job with its assigned first value in the queue at a first selected location;

d) processing at least a portion of the first job; and e) interrupting processing of the first job to process the second job when the magnitude of the second value is greater than the magnitude of the first value.

2. The method of claim 1, in which a demand to process the second job immediately is provided with the second job, further comprising determining that the preselected condition is met by detecting, with the controller, the presence of the demand.

3. The method of claim 1, further comprising increasing the magnitude of the first value to obtain a third value when processing of the first job is interrupted by the second job.

4. The method of claim 3, in which a processing of the first job is interrupted by a third job, further comprising increasing the third value to a fourth value provided the fourth value does not exceed a preselected maximum value.

5. The method of claim 1, further comprising increasing the magnitude of the first value to obtain a third value after a preselected amount of time has passed since the job was placed in the queue.

6. The method of claim 1, in which a job can be assigned a selected one of two types of interrupts, wherein said (b) includes setting the magnitude of the second value at one level when the second job is intended to function as a first interrupt type and at another level when the second job is intended to function as a second interrupt type.

7. A method of managing the processing of a plurality of jobs in a queue of a multifunctional printing system in which a first job, second job and third job are stored in the queue for processing, the multifunctional printing system including a controller for facilitating placement of the jobs into the queue, the first job being developed at a first service, the second job being developed at a second service and the third job being developed at a third service, comprising:

a) determining, with the controller, that the first job was developed at the first service, the second job was developed at the second service and the third job was developed at the third service;

b) in response to said determining of (a), assigning a first value to the first job, a second value to the second job and a third value to the third job, the first, second and third values varying respectively in magnitude as a function of the first, second and third services;

c) placing the first job and the second job at a first selected location in the queue and a second location in the queue, respectively;

d) processing at least a portion of the first job; and e) interrupting processing of the first job to process the third job when the magnitude of the third value is greater than the magnitude of either of the first value or the second value, and (ii) a preselected condition is met.

8. The method of claim 7, further comprising:

(f) determining whether the preselected condition is met by determining whether the third job includes a command indicating that the third job is be printed immediately.

9. The method of claim 8, further comprising processing the third job after processing all of the first job when it is determined, with said (f), that the command is not present.

10. A method of managing the processing of a plurality of jobs in a queue of a multifunctional printing system in which a first job and a second job are stored in the queue for processing, the multifunctional printing system including a job memory for storing a first set of image data corresponding with the first job and a second set of image data corresponding with the second job, the multifunctional printing system further including a controller for facilitating placement of the jobs into the queue, the first job being developed at a first service and the second job being developed at a second service, comprising:

a) placing the first job in the queue and processing a portion of the first job, the first portion being less than all of the first job;

b) prior to storing the second set of image data in the job memory, determining whether said storing would reduce an amount of available memory in the job memory below a selected threshold; and c) when it is determined, with said (b), that the amount of available memory would be reduced below the selected threshold, processing the second job ahead of the first job so that a second portion of the first job remains unprocessed and all of the second job is processed prior to the processing of the first job second portion.

11. The method of claim 10, further comprising developing the second job with a facsimile service.

12. The method of claim 10, in which a third job, corresponding with a third set of image data, is provided to the printing system prior to processing the second portion of the first job, further comprising:

d) prior to storing the third set of image data in the job memory, determining whether said storing would reduce an amount of available memory in the job memory below the selected threshold; and e) when it is determined, with said (d), that the amount of available memory would be reduced below the selected threshold, processing the third job ahead of the first job so that the second portion of the first job remains unprocessed and all of the third job is processed prior to the processing of the first job second portion.

* * * * *